United States Patent [19]

Holtz et al.

[11] Patent Number: 4,881,159
[45] Date of Patent: Nov. 14, 1989

[54] SWITCHING-RELIEVED LOW-LOSS THREE-LEVEL INVERTER

[75] Inventors: Joachim Holtz; Samir Salama, both of Wuppertal; Theodor Salzmann, Erlangen, all of Fed. Rep. of Germany

[73] Assignee: Siemens Aktiengesellschaft, Munich, Fed. Rep. of Germany

[21] Appl. No.: 288,284

[22] Filed: Dec. 21, 1988

[30] Foreign Application Priority Data

Dec. 21, 1987 [DE] Fed. Rep. of Germany ....... 3742437
Dec. 21, 1987 [DE] Fed. Rep. of Germany ....... 3743436

[51] Int. Cl.⁴ .......................................... H02M 7/521
[52] U.S. Cl. ...................................... 363/58; 363/137
[58] Field of Search ............... 363/56, 58, 68, 132, 363/137

[56] References Cited

U.S. PATENT DOCUMENTS

| | | | |
|---|---|---|---|
| 4,270,163 | 5/1981 | Baker | 363/132 |
| 4,446,513 | 5/1984 | Clenet | 363/132 |
| 4,639,850 | 1/1987 | Asaeda et al. | 363/136 |
| 4,686,618 | 8/1987 | McMurray | 363/137 |

FOREIGN PATENT DOCUMENTS 63076 4/1983 Japan ...................................... 363/58

Primary Examiner—William H. Beha, Jr.
Attorney, Agent, or Firm—Kenyon & Kenyon

[57] ABSTRACT

A three-level inverter, in which the upper and lower half of each phase relieves the semiconductor switching elements from excessive values of the rate of rise of the recurring positive forward blocking voltage. This is done with a circuit arrangement in each half has a wiring diode, a switching off relief capacitor, a further wiring diode, a storage capacitor and a discharging resistor serving as the d-c load. Additional energy feedback devices feed back, into the supplying d-c voltage source, energy which is produced in the switching-off process and is temporarily stored in the circuitry.

14 Claims, 8 Drawing Sheets

SWITCHING-RELIEVED LOW-LOSS THREE-LEVEL INVERTER

FIELD OF THE INVENTION

The present invention relates to the field of three-level inverters, and more particularly to an inverter having an inverter phase with a series arrangement of multiple antiparallel circuits, each antiparallel circuit including a semiconductor switching element and a bypass diode. A phase output is formed by a junction point of the second and third antiparallel circuits, while a d-c voltage source supplies voltage to the phase. First and second switching-on relief chokes couple the series arrangement of antiparallel circuits to the positive and negative potentials of the d-c voltage source. First and second voltage divider capacitors are supplied by the d-c voltage source, with a junction point formed between the first and second voltage divider capacitors. A first decoupling diode is coupled between the junction point between the first and second voltage divider capacitors, and the junction point between the first and second antiparallel circuits. The second decoupling diode is coupled between the junction point between the first and second voltage divider capacitors and the junction point between the first and second antiparallel circuits. A second decoupling diode is coupled between the junction point between the first and second voltage divider capacitors and the junction point between the third and fourth antiparallel circuits.

BACKGROUND OF THE INVENTION

An output section of a three-level inverter is known, for instance, from the publication "A New Neutral-Point-Clamped PWM Inverter" in "IEEE Transactions on Industry Applications", Vol. IA-17, No. 5, September/October 1981, Pages 518 to 521, as is shown in FIG. 1 of that publication.

German Offenlegungschrift No. 32 44 623 shows in its FIGS. 5 and 6, wiring arrangements for two antiparallel circuits forming the power section in one phase of a bridge inverter. Each antiparallel circuit has one semiconductor switching element and a corresponding bypass diode. The bypass diodes serve as the switching-off relief of the semiconductor switching elements. The rate of rise of the recurring positive forward voltage is limited during the interruption process and thereby, the occurrence of excessively high power losses in the respective semiconductor switching elements is avoided. In one embodiment of this known wiring arrangement, a series circuit comprising a first switching-off relief diode and a switching-off relief capacitor is connected to one of the two antiparallel circuits in one phase of the bridge inverter. The junction point of these two wiring elements is in electrical contact with the junction point between the elements of a second series circuit via a second switching-off relief diode. The second series circuit comprises a d-c load and a storage capacitor and is connected parallel to the supplying d-c voltage source.

An additional switching-on relief choke limits the rate of rise of the load current upon switching on of one of the semiconductor switching elements. The relief choke is connected in series with the junction point provided for connection to the potential of the d-c voltage source of the antiparallel circuit that is provided with the wiring arrangement described above. Depending on the circuit design, this switching-on relief choke can also be formed by the unavoidable parasitic stray inductances of the leads. The switching-on relief choke serves at the same time as a so-called reversing choke. This is done in order to bring the switching-off relief capacitor of one of the semiconductor switching elements of the inverter to such a charging state that it can have a relief effect during a subsequent disconnection of one of the semiconductor switching elements.

In such a switching-off process, the load current driven by the switching-on relief choke is diverted via the first switching-off relief diode to the switching-off relief capacitor. In this manner, the current through a semiconductor switching element to be switched off is interrupted nearly as a step function. Also, the rate of rise of the recurring positive blocking voltage in the forward direction is limited due to the finite charge reversal rate of the switching-off relief capacitor.

After the switching-off relief capacitor has been charged to the value of the d-c voltage supply, the current of the switching-on relief choke leads until its complete decay, to a further charging of the then effective parallel circuit comprising the switching-off relief capacitor and the storage capacitor. While the two capacitors are only slightly overcharged so that the overvoltage stress of the semiconductor switching element to be switched off remains small, this property of the wiring can further be aided by the provision that the storage capacitor has a considerably larger capacity than the switching-off relief capacitor. The storage capacitor therefore has the purpose of temporarily storing the energy of the switching-off relief choke serving to relieve the switching on process and for switching off. So that the storage capacitor can carry this out for every switching cycle in the same manner, it is periodically discharged via the d-c load connected in series. An ohmic resistor can be used as the d-c load. In another known embodiment the power loss produced during the switching relief of the semiconductor switching element of the respective inverter phase is not canceled, but instead returned to the supplying d-c voltage source by a feedback circuit.

During the switching-off of one semiconductor switching element of one phase, the series circuit of the first switching-off relief diode and the switching-off relief capacitor forms a relief path. During the switching-off of the other semiconductor switching element of the phase, the series circuit of the switching-off relief capacitor, the second switching-off relief diode and the storage capacitor forms a longer relief path for the load current to be commutated off, and therefore this circuit has a slight asymmetry. This manifests itself in a slightly larger parasitic stray inductance in the relief path for the other semiconductor switching element and thus in a slightly higher voltage stress during the switching-off of this semiconductor switching element.

In European Pat. Application No. 88110741.1, a device for the low-loss wiring of the semiconductor switching element of a three-level inverter is described. The circuitry described there, however, has the disadvantage that a multiplicity of components is necessary for achieving the desired switching relief effect. It is advantageous for the functioning of the known circuitry to provide modifications in the basic circuit of the three-level inverter by using additional switching-on relief chokes in the output sections. This increases the cost of the circuit further.

A problem posed by the prior art is to provide an arrangement for relieving as uniformly as possible the switching-on and off of semiconductor switching elements in the phase of a three-level inverter, which uses as few components as possible.

The present invention provides that the circuitry known from German Offenlegungsschrift No. 32 44 623 for the semiconductor switching elements in the phases of an inverter in a bridge circuit can also be used for the semiconductor switching elements in the phases of a three-level inverter. For applying this known circuitry arrangement to a three-level inverter, no adaptations in the output section of the three-level inverter are necessary. It has furthermore been found to be particularly advantageous that the known wiring arrangement in a first embodiment of the invention can be used without change to the internal circuit. It is a further advantage of the invention that, if necessary, other wiring arrangements which likewise have a relief effect for the switching, especially RCD wiring arrangements, can be connected without detrimentally affecting the functioning of the circuitry according to the invention.

The problems discussed above are solved in the present invention by providing a three-level inverter having at least one inverter phase with a series arrangement of first, second, third and fourth antiparallel circuits, each antiparallel circuit including a semiconductor switching element and a bypass diode. A phase output is formed by a junction point of the second and third antiparallel circuits, while a d-c voltage source supplies voltage to the phase. First and second switching-on relief chokes couple this series arrangement to the positive and negative potentials of the d-c voltage source. First and second voltage divider capacitors are coupled to be supplied by the d-c voltage source, with the junction point formed between the first and second voltage divider capacitors. A first decoupling diode is coupled between the junction point between the first and second voltage divider capacitors in a junction point between the first and second antiparallel circuits. A second decoupling diode is coupled between the junction point between the first and second voltage divider capacitors and a junction point between the third and fourth antiparallel circuits.

The invention provides a means for relieving the semiconductor's switching elements during a switching-off process. This means for relieving includes a first series circuit having a first wiring diode and a first switching-off relief capacitor, this first series circuit shunting the first antiparallel circuit. The second series circuit having a second wiring diode and a second switching-off relief capacitors shunts said fourth antiparallel circuit. The means for relieving includes a third series circuit having a first storage capacitor and a first d-c load, this third series circuit being shunted across the first voltage divider capacitor. A fourth series circuit has a second storage capacitor and a second d-c load, and is shunted across the second voltage divider capacitor. A third wiring diode is coupled between the junction point of the first wiring diode and the first switching-off relief capacitor and the junction point of the first storage capacitor and the first d-c load. A fourth wiring diode is coupled between the junction point of the second wiring diode and the second switching-off relief capacitor and the junction point of the second storage capacitor and the second d-c load.

DETAILED DESCRIPTION

Referring to the circuit shown in FIG. 1, an output section of a three-level inverter will be explained in greater detail using the example of one phase. This phase contains a series arrangement of four antiparallel circuits each having a semiconductor switching element and a bypass diode. For semiconductor switching elements, MOS field-effect power transistors, bipolar power transistors or GTO thyristors which can be switched off are used, for example. If power field effect transistors are used, the respective antiparallel bypass diode can be omitted because frequently an inverse diode is already internal to the component.

Figure 1:
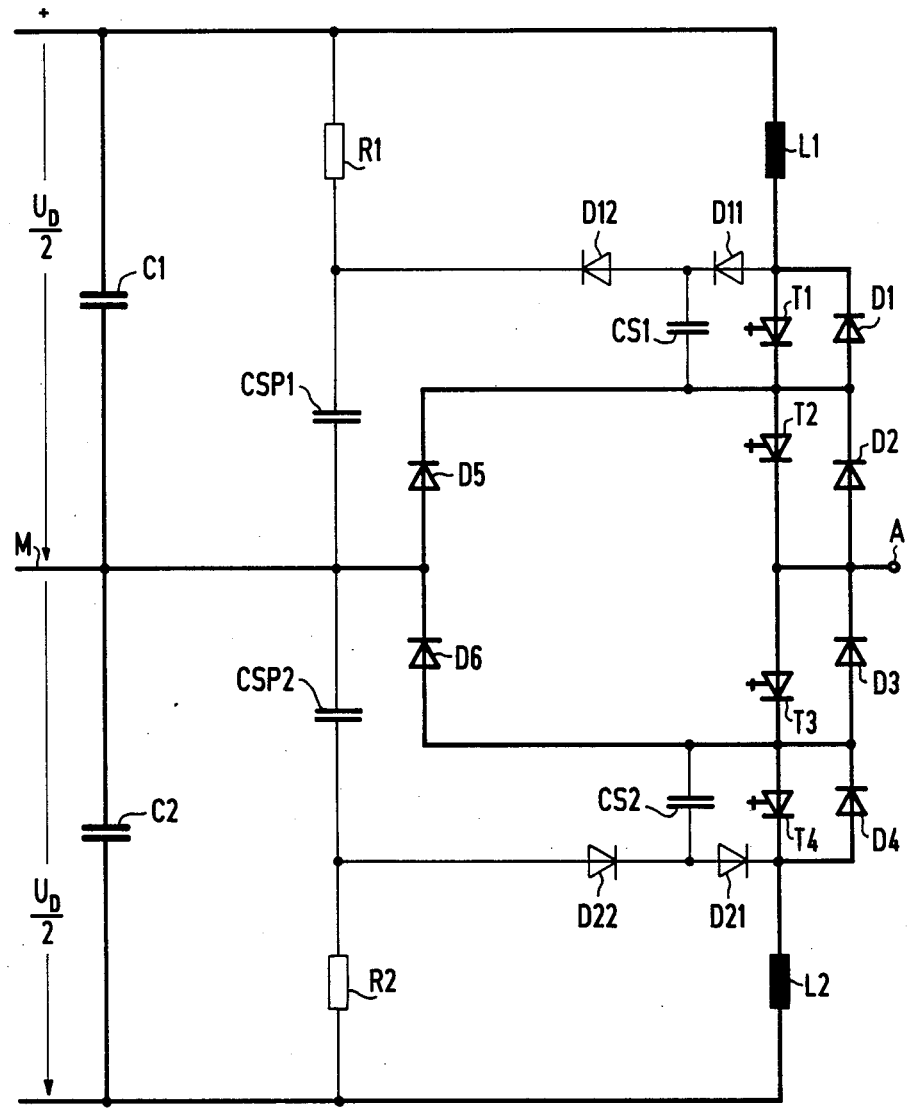
FIG. 1 shows a phase of a three-level inverter with external wiring according to the present invention.

In the phase shown in FIG. 1, the four GTO thyristors T1, T2, T3, T4, for example, are shunted antiparallel by the bypass diodes D1, D2, D3, D4. The first and third antiparallel circuits of T1, D1 and T3, D3, and the second and fourth antiparallel circuits of T2, D2 and T4, D4, each represents a part of the inverter phase. This series arrangement of the four antiparallel circuits is supplied via four junction points by a d-c voltage source $U_D$. The ends of the series arrangement are coupled via a switching-on relief choke L1, L2, respectively, to the positive and negative potentials of the d-c voltage source. The two other junction points correspond to the junction point of the first and the second, and the junction point of the third and the fourth antiparallel circuits. These junctio points are respectively connected via first and second decoupling diodes D5 and D6 to the junction point M ("virtual center") of two voltage divider capacitors C1 and C2 which are supplied by the d-c voltage source $U_D$. The junction point between the second and the third antiparallel circuits serves as the output A of the inverter phase.

It is not necessary in every case to provide the switching-on relief chokes L1 and L2 as discrete components. Depending on the circuit design, the frequently existing parasitic line inductances can be sufficient for limiting the current rise in the leads of the inverter phase.

In such a circuit as described above, it is necessary to provide switching relief devices for the power semiconductors. For this purpose, the GTO thyristors T1, T2, T3, T4 and the decoupling diodes D5, D6 can each be provided, for instance, with an RCD relief network. Such an arrangement, however, has the disadvantage that a multiplicity of components is required to obtain the necessary switching relief.

The output section, described above, of a phase of the inverter is known. According to the present invention, the two parts of a phase of a three-level inverter shown in FIG. 1, comprising the elements T1, D1, T3, D3 and T2, D2, T4, D4, are provided with circuitry arrangements each of which respectively comprises the elements D11, CS1, D12, CSP1, R1 and D21, CS2, D22, CSP2, R2. The first antiparallel circuit comprising the semiconductor switching element T1 and the bypass diode D1, is shunted by a first series circuit comprising a first wiring diode D11 and a first switching-off relief capacitor CS1. The junction point of these two elements is electrically connected to the junction point of a second series circuit of two elements via a third wiring diode D12.

This second series circuit has a first storage capacitor CSP1, and a first discharging resistor R1 that serves as the d-c load. The second series circuit is shunted across the first voltage divider capacitor C1 for the input d-c voltage $U_D$. Similarly, the fourth antiparallel circuit comprising the semiconductor switching element T4 and the bypass diode D4 is shunted by a third series circuit comprising a second wiring diode D21 and a second switching-off relief capacitor CS2. The junction point of these two elements is also electrically connected to the junction point of the two elements of a fourth series circuit via a fourth wiring diode D22. This fourth series circuit comprises a second storage capacitor CSP2 and a second discharging resistor R2 as the d-c load. The fourth series circuit is shunted across the second voltage divider capacitor C2 for the input d-c voltage $U_D$.

For generating a positive voltage at the output A of the phase shown in FIG. 1 of the three-level inverter, the semiconductor switching elements T1 and T3 are preferably switched on and off sequentially and alternately with the semiconductor switching element T2 conducting and the semiconductor switching element T4 blocked. If the current-carrying semiconductor switching element T1 is switched off, the first series circuit (D11, CS1) serves as a relief path for the switching-off relief of element T1. The switching-on relief choke L1 charges the capacitor CS1 to the value of one-half the input d-c voltage $U_D$. The parallel circuit comprising the first switching-off relief capacitor CS1 and a series circuit of the third wiring diode D12 and the first storage capacitor CSP1 is effective on the current which is still flowing after the capacitor CS1 is charged until the capacitor CS1 is discharged completely. A d-c load, for example, the first discharging resistor R1, discharges the capacitors CS1 and CSP1, which are charged only slightly above the value of $U_D$, to the value of the input d-c voltage $U_D$.

When T1 is being switched on and after the load current has passed from the decoupling diode D5 to the semiconductor switching element T1, the switching-off relief capacitor CS1 is discharged via the elements D12, CSP1, C1, L1 and T1. After CS1 is discharged, the current stored in the switching-on relief choke L1 above the value of the load current decays via the elements D11, D12, CSP1, C1 and leads to the charging of the storage capacitor CSP1. The storage capacitor CSP1 which is thereby charged up again slightly above the value of the input voltage $U_D$, is finally discharged via the first discharging resistor R1 down to the value of $U_D$. The circuitry arrangement has again reached its starting state so that it can again provide switching-off relief.

This upper circuitry portion comprising the elements D11, CS1, D12, CSP1, and R1 also has a relieving effect when the current-carrying semiconductor switching element T3 is switched off. In this case, the shunted series circuit comprising the bypass diode D2, the first switching-off relief capacitor CS1, the third wiring diode D12 and the first storage capacitor CSP1 provides the switching relief of the series circuit comprising the semiconductor switching element T3 and the second decoupling diode D6.

The relief path that is effective when the semiconductor switching element T3 is being switched off is longer than when the semiconductor switching element T1 is switched off, when the directly shunted series arrangement of the first wiring diode D11 and the first storage capacitor CS1 brings about the relief. Thus, the relief path effective when T3 is switched off has a slightly larger parasitic stray inductance, and for this reason, a slightly greater voltage stress of the semiconductor switching element T3 to be switched off can be expected. Furthermore, the scattering of this longer relief path is further increased slightly by the fact that now the four components D2, CS1, D12 and CSP1 participate in the relief of T3, while as far as the relief of T1 is concerned, only the components D11 and CS1 participate. The quality of the relief of T3 is reduced by the spike voltage which occurs in diodes at the beginning of current conduction. This asymmetry in the relief effect to be achieved of the two semiconductor switching elements T1 and T3 is necessary for generating a positive output voltage. The asymmetry can be harmonized sufficiently through the use of a storage capacitor having a capacity which is substantially larger than that of the switching-off relief capacitor.

For generating a negative voltage at the output A of the phase shown in FIG. 1, the two semiconductor switching elements T2 and T4 are switched on and off alternately in pulse fashion, with the semiconductor switching element T1 conducting and the semiconductor switching element T3 cut off. The lower part of the circuitry comprising the elements D21, CS2, D22, CSP2 and R2 has a switching-relief action comparable with the processes just described for the upper part of the circuitry. This switching-relief action is provided for the semiconductor switching element T4 and the series circuit comprising the semiconductor switching element T2 and the decoupling diode D5.

In the arrangement of the circuitry according to the present invention, the decoupling diodes D5, D6, of the output section of the three-level inverter that carries at times the full load current, are also included in the switching relief. No separate switching relief is therefore necessary for the decoupling diodes D5, D6.

In the arrangement according to the present invention, none of the relief paths necessary for relieving one of the semiconductor switching elements T1 to T4 are closed via one of the voltage divider capacitors C1 or C2. The expected parasitic scattering of the individual relief paths is therefore relatively small so that as a rule, excessively high voltage stresses during the switching-off process of one of the semiconductor switching elements are not expected. For this reason, it is also possible with the circuitry according to FIG. 1, to switch off in the operating mode pulse quenching for shutting down the three-level inverter. For instance, in case of a fault on the load side, the respectively fired semiconductor switching elements are switched off without regard to the actual value of the load current. If, on the other hand, one of the relief paths were to close via the intermediate link, switching off the respective semiconductor switching element may not be possible independently of the load current. Rather, one must wait in this case, under some circumstances, for the natural decay of the load current until a nondestructive switching off of the semiconductor switching elements is possible.

Figure 2:
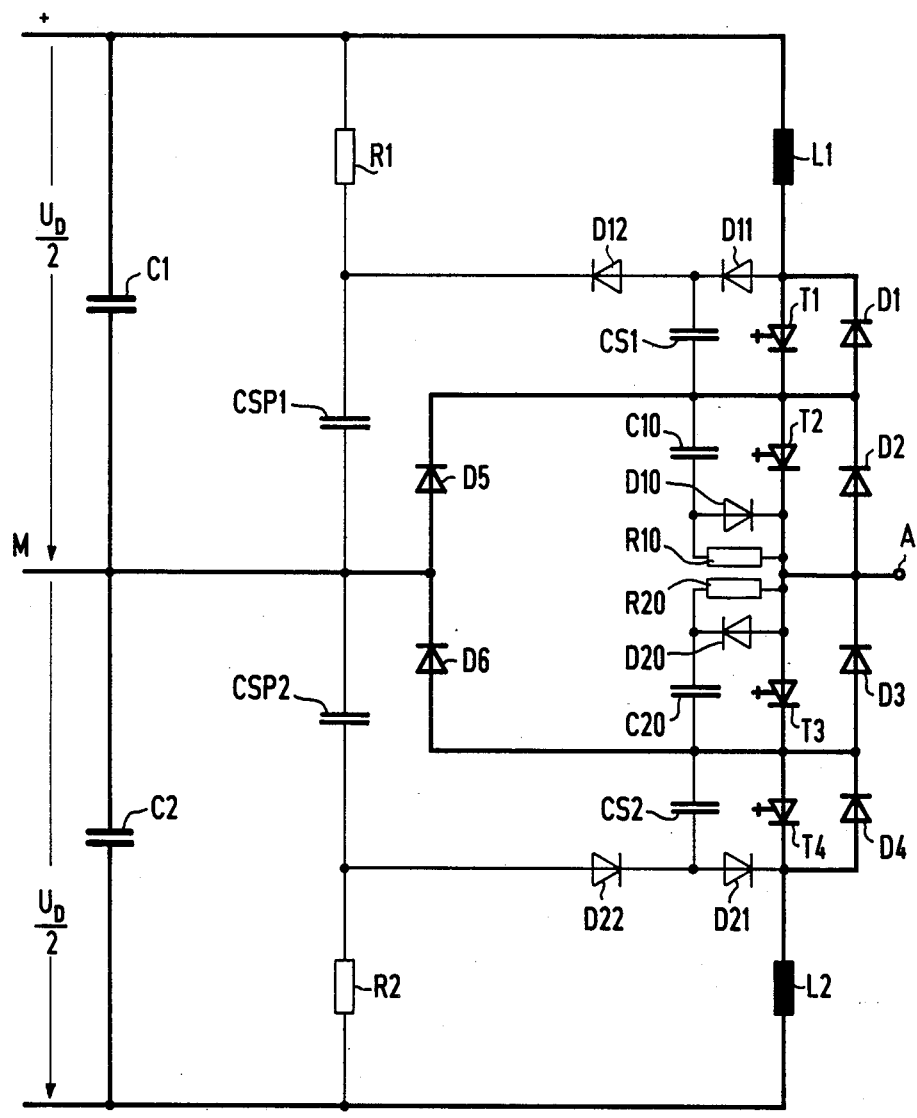
FIG. 2 shows the circuit of FIG. 1 with additional circuitry for internal semiconductor switching elements of the three-level inverter phase.

FIG. 2 illustrates another embodiment of one phase of the three-level inverter in accordance with the present invention. Each of the two inner antiparallel circuits comprising the semiconductor switching element T2 and the bypass diode D2, and the semiconductor switching element T3 and the bypass diode D3 is provided with an additional known RCD wiring network. A first supplemental wiring capacitor C10, a first supplemental wiring diode D10 and a first supplemental wiring resistor R10 are associated with the second antiparallel circuit, and a second supplemental switching capacitor C20, a second supplemental wiring diode D20, and a second supplemental wiring resistor R20 are associated with the third antiparallel circuit. The capacities of the supplemental wiring capacitors C10 and C20 are preferably considerably smaller than those of elements CS1, CS2, CSP1 and CSP2. This is because capacitors C10 and C20 need to damp in particular only the spike voltages of the bypass diode D2 and D3.

The above embodiment is particularly advantageous if for reasons of practical circuit design or due to the specific characteristics of the semiconductor switching elements T1 to T4 used, the relief paths for the inner semiconductor switching elements T2 and T4 exhibit excessively high parasitic stray inductances. The circuitry of FIG. 1, according to the present invention, can be combined without adversely affecting its operation with other known circuit arrangements such as RCD switching-off relief circuitry, as illustrated in FIG. 2.

Figure 3:
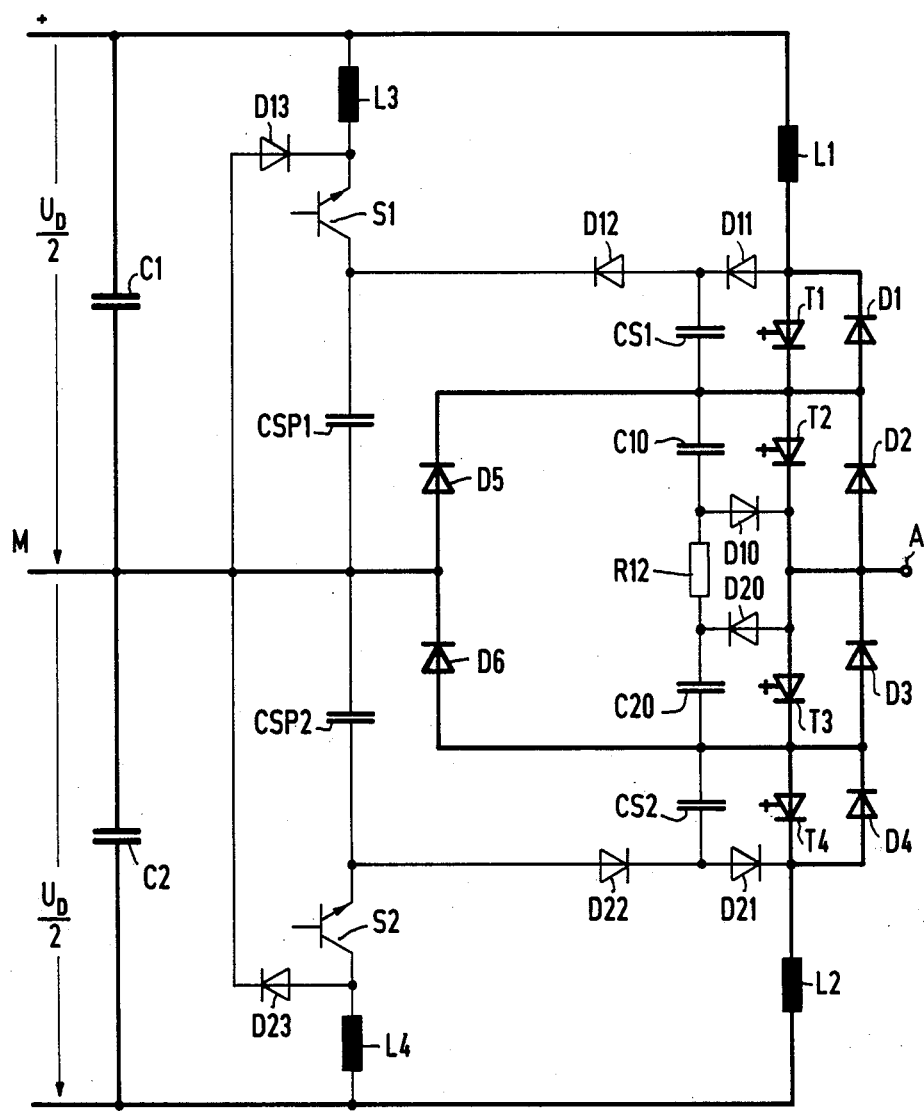
FIG. 3 shows the circuit of FIG. 2 with additional energy feedback devices for the circuitry according to the present invention and with supplemental wiring for the internal semiconductor switching element.

In FIG. 3 another embodiment of the present invention is shown. Here, a common supplemental resistor R12 is used in place of the two separate supplement resistors R10 and R20 (FIG. 2) which are associated with the supplemental wiring arrangements for the second and third antiparallel circuits. The common supplemental resistor R12 is connected between the junction points of elements C10 and D10, C20 and D20. Furthermore, as d-c loads, energy feedback circuits are used instead of the discharging resistors R1 and R2 in the embodiments of FIGS. 1 and 2. These energy feedback circuits make possible a feedback of the switching-off energy losses which are produced when the individual semiconductor switching elements are switched off and that are temporarily stored in the storage capacitors CSP1 and CSP2. Each of these energy feedback circuits comprises a switching element S1, S2, a storage inductance L3 and L4, and a coupling diode D13, D23. The series circuit comprising one of the switching elements and the corresponding storage inductance is employed in this embodiment instead of the respective discharging resistor. The respective junction points between the elements S1 and L3, S2 and L4 is always connected via one of the two coupling diodes D13 and D23 to the junction point M of the two voltage divider capacitors C1 and C2.

For feeding back, for instance, the overcharging energy contained in the storage capacitor CSP1, the first switch S1 is clocked at a high frequency. In the closed state of the switch S1, part of the capacitor energy is transferred to the storage inductance L3. Since upon the subsequent opening of the switch S1 the current flow through the inductance L3 cannot be interrupted suddenly, energy is fed back into the d-c voltage source $U_D$. The coupling diode D13 prevents a renewed swinging back of the energy from the d-c voltage source $U_D$ which would otherwise occur in a mesh which is very similar to a tuned circuit if the coupling diode D13 were not there. Such an energy feedback circuit is also called a chopper circuit.

Figure 4:
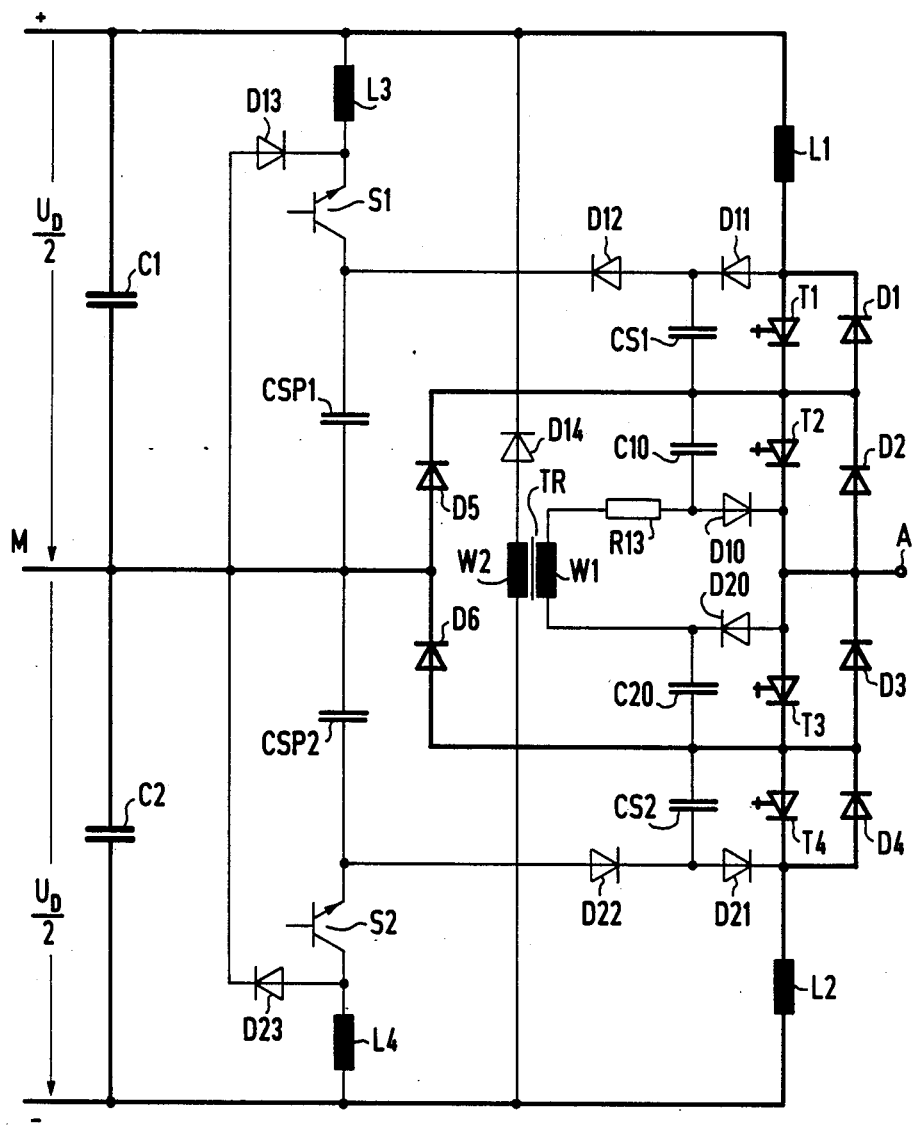
FIG. 4 shows the circuit of FIG. 3 with a further energy feedback device for the additional circuit of the internal semiconductor switching element.

FIG. 4 shows another embodiment of the circuitry according to the invention. Instead of the common supplementary wiring resistor R12 in the circuit of FIG. 3, a further energy feedback device for the power losses is provided which are temporarily stored from the elements C10, D10 and S20, D20, respectively, in the supplemental wiring arrangement associated with the antiparallel circuits T2, D2 and T3, D3. This feedback device has an isolating transformer TR, the primary winding W1 of which is in electrical contact with the junction point of the elements C20, D20, and the junction point of elements C10, D10 via a damping resistor R13. The secondary winding W2 of the isolating transformer is connected to the negative potential and via a further coupling diode D14 to the positive potential of the input d-c voltage $U_D$. It is advantageous if the secondary winding W2 has a larger number of turns than the primary one. The turns ratio W2:W1 may be, for instance, 4:1. This embodiment provides a highly effective and at the same time almost completely loss-free switching relief for a three-level inverter.

Figure 5:
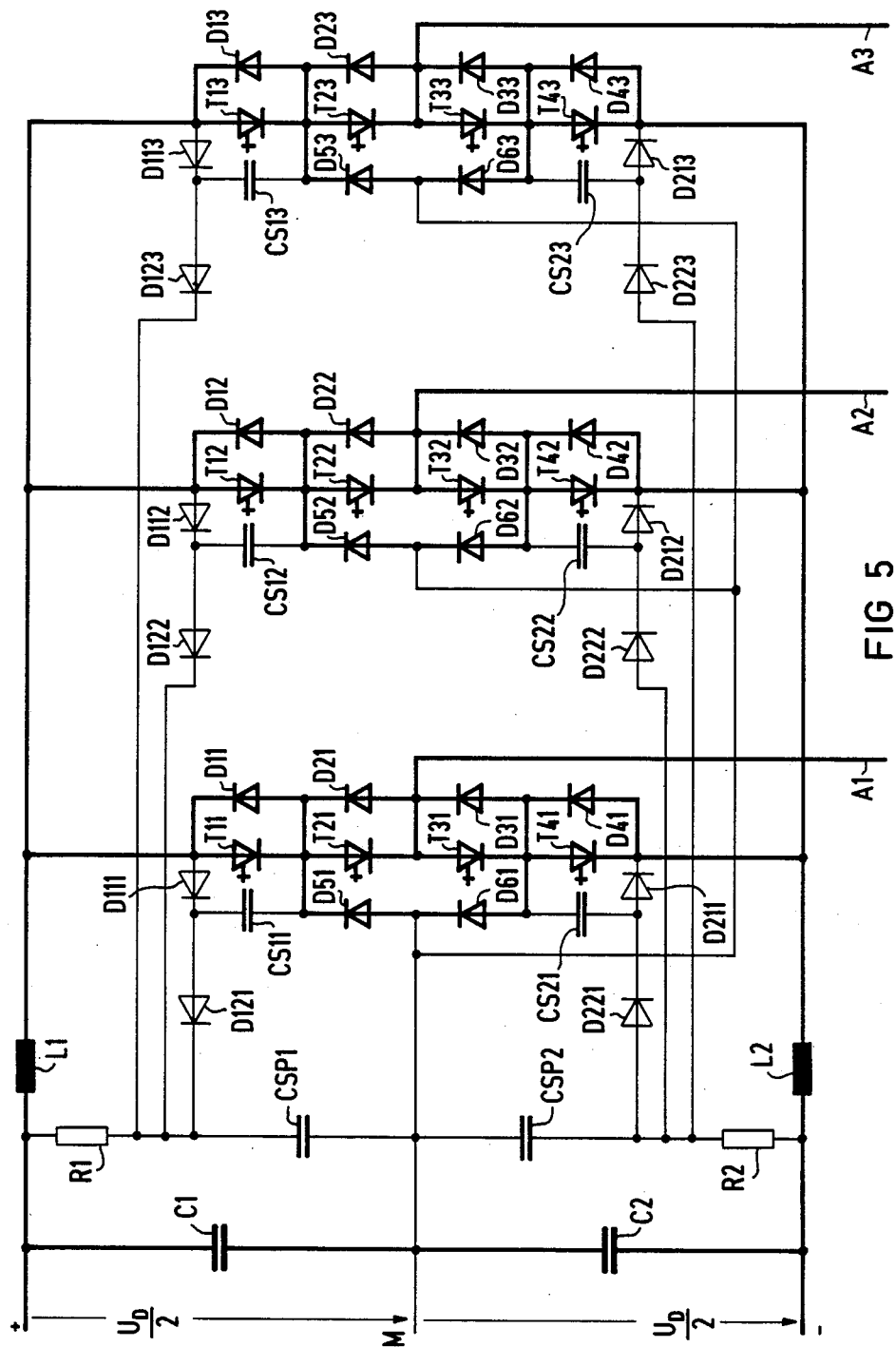
FIG. 5 shows a three-phase three-level inverter with the circuitry of the invention according to FIG. 1.

In FIG. 5 the present invention is illustrated by the example of a three-phase three-level inverter with the outputs A1–A3. As already discussed, only one series circuit comprising the first storage capacitor CSP1 and the first discharging resistor R1 and one series circuit comprising the second storage capacitor CSP2 and the second discharging resistor R2 is required for the three phases. The upper and lower halves of all inverter phases are connected jointly to the junction point of these elements via the respective external wiring diodes D121, D111; D122, D112; D123, D113; and D221, D211; D222, D212; D223, D213.

Figure 6:
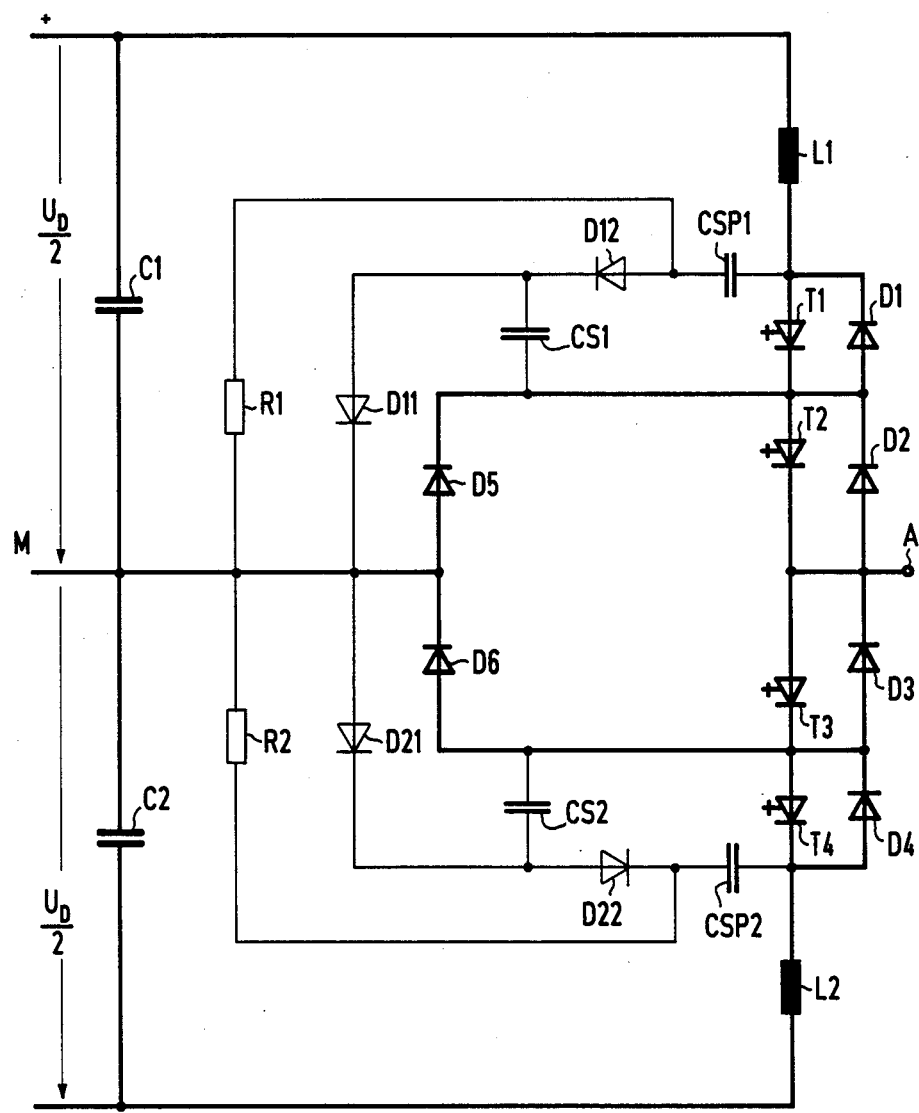
FIG. 6 shows one phase of a three-level inverter with a further embodiment of the circuitry of the invention according to FIG. 1.

Another embodiment of the present invention is shown in FIG. 6 in the form of an inverted arrangement of the circuit of FIG. 1. Each of the elements of the circuit of FIG. 1 is therefore also present in the circuit of FIG. 6. Thus, a circuit arrangement with a first wiring diode D11, a first switching-off relief capacitor CS1, and a third wiring diode D12, a first storage capacitor CSP1, and a first discharging resistor R1 serves for the switching relief of the first semiconductor switching element T1 and the series circuit comprising the semiconductor switching element D3 and the decoupling diode D6. The series circuit of the first wiring diode D11 and the first switching-off relief capacitor CS1 is shunted across the first decoupling diode D5. The series circuit of the first storage capacitor CSP1 and the first discharging resistor R1 is shunted in this embodiment across the series circuit of the first switching-on relief choke L1 and the first voltage divider capacitor C1. The junction points between the elements D11, CS1, and CSP1, R1 are electrically coupled via the third wiring diode D12. Similarly, the semiconductor switching element T4 and the series circuit comprising the semiconductor switching element T2 and the decoupling diode D5 is associated with a wiring arrangement of the elements D21, CS2, D22, CSP2 and R2.

Due to the inverted arrangement of the wiring elements compared to the circuit of FIG. 1, different relief paths are obtained when the individual semiconductor switching elements are switched off. This will be explained by the example of the semiconductor switching elements T1 and T3 for the upper part of the arrangement of the elements CSP1, D12, CS1, D11 and R1. When the semiconductor switching element T1 is switched off, the shunted series arrangement of the first storage capacitor CSP1, the third wiring diode D12, and the first switching-off relief capacitor CS1 has a relieving effect. Furthermore, for the series arrangement of the semiconductor switching element T3 and the second decoupling diode D6, the relief path is closed via the bypass diode D2, the first switching-off relief capacitor CS1 and the first wiring diode D11. In this case, a first discharging resistor R1 serves as a d-c load for returning the elements to the charging state. The first discharging resistor R1 causes the storage capacitor CSP1 to return to a condition in which it can again temporarily store the energy loss produced by a subsequent switching-off of one of the semiconductor switching elements.

The operation of the inverted arrangement of the elements according to FIG. 6 is therefore in principle identical with that of the circuit of FIG. 1. However, in the embodiment according to FIG. 6, the asymmetry due to the circuit which was already described for the example of FIG. 1 is largely compensated in the expected relief actions for the semiconductor switching elements T1 and T3; T4 and T2. Thus, in the embodiment of FIG. 6, for instance, the relief path for T1 while it is closed is via the elements CSP1, D12 and CS1 and is therefore longer than the relief path in the example of FIG. 1. The relief path for T3 in FIG. 6 is closed via the elements D2, CS1, and D11 is therefore shorter than the relief path in the circuit of FIG. 1. For this reason the parasitic stray inductances to be expected of the two relief paths are approximately of the same size and are less dependent on the final circuit design. Thus, in the embodiment of the present invention according to FIG. 6, a supplemental wiring of the internal semiconductor switching elements T2 and T3, such as used in the embodiments shown in FIGS. 2-4, can be dispensed with.

Figure 7:
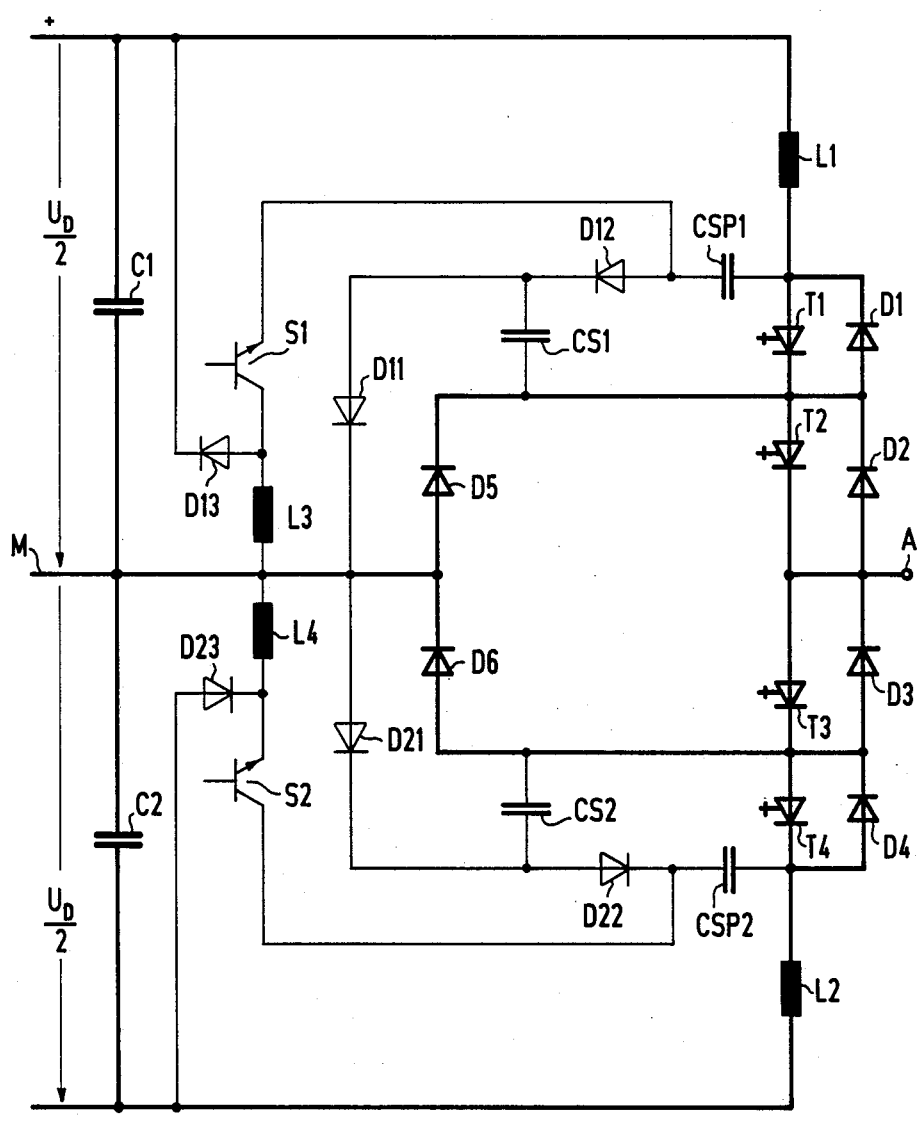
FIG. 7 shows the circuit of FIG. 6 with additional energy feedback devices for the circuitry according to the present invention.

Similarly, as in the embodiments shown in FIGS. 3 and 4, the discharging resistors R1 and R2 can be replaced by energy feedback circuits. The chopper circuits already described in FIGS. 3 and 4 and comprising the elements S1, L3, D13 and S2, L4, D23 are shown replacing the resistors R1 and R2 of FIG. 6 in FIG. 7.

Figure 8:
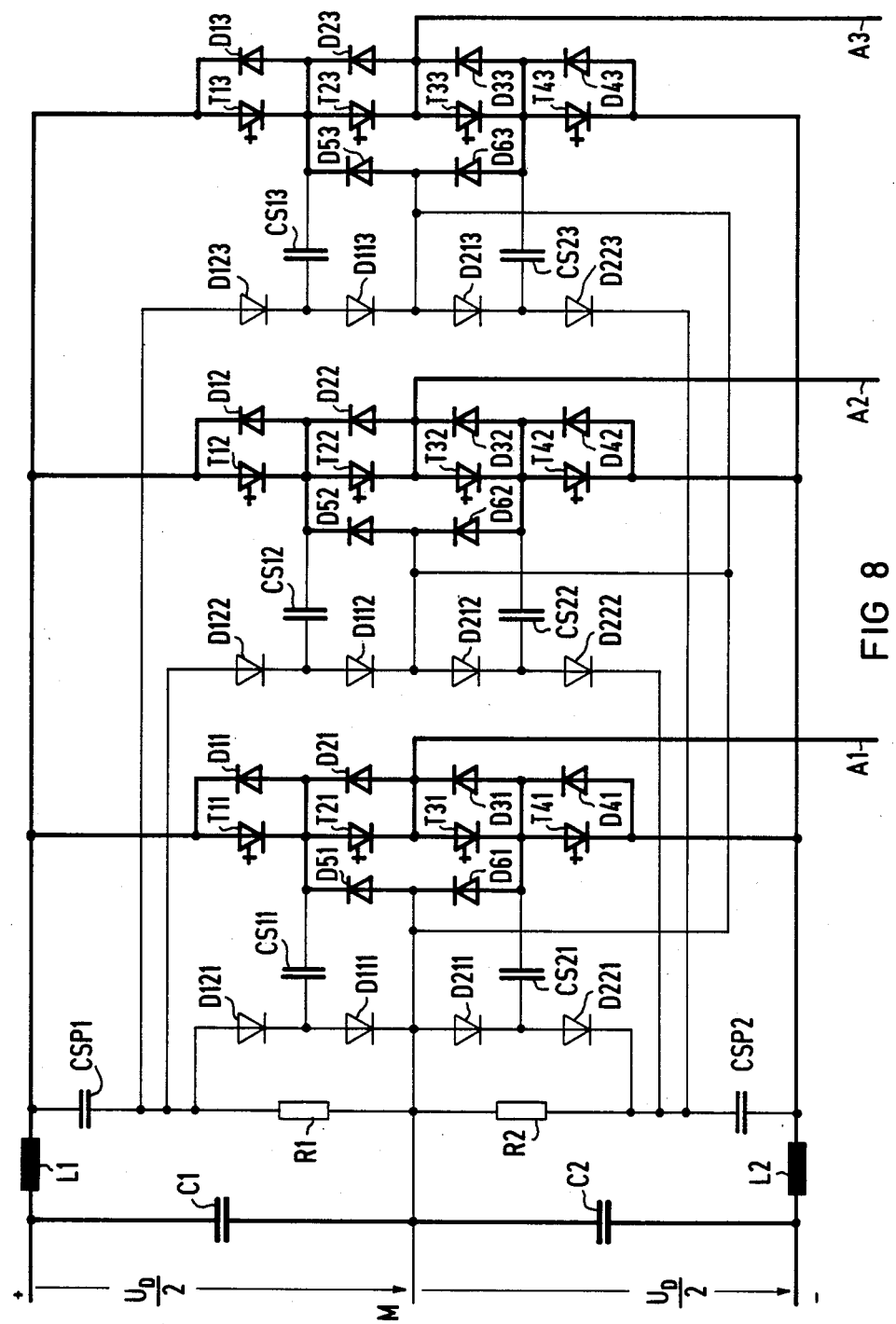
FIG. 8 shows a three-phase three-level inverter with the embodiment of the circuitry of the present invention according to FIG. 6.

In FIG. 8, a three-phase arrangement of the embodiment of the invention according to FIG. 6 is shown which is comparable to the illustration of FIG. 5. In this embodiment, as in FIG. 5, series circuits of the elements R1, CSP1 and R2, CSP2 are required only once for all phases of the three-level inverter.

What is claimed:
1. A three-level inverter, comprising:
at least one inverter phase having a series arrangement of first, second, third and fourth antiparallel circuits, each antiparallel circuit including a semiconductor switching element and a bypass diode;
a phase output formed by a junction point of said second and third antiparallel circuits;
a d-c voltage source which supplies voltage to the phase;
first and second switching-on relief chokes which couple said series arrangement to the positive and negative potentials of the d-c voltage source;
first and second voltage divider capacitors coupled to be supplied by the d-c voltage source, with a junction point formed between said first and second voltage divider capacitors;
a first decoupling diode coupled between said junction point between said first and second voltage divider capacitors and a junction point between said first and second antiparallel circuits;
a second decoupling diode coupled between said junction point between said first and second voltage divider capacitors and a junction point between said third and fourth antiparallel circuits; and
means for relieving the semiconductor switching elements during a switching-off process, said means for relieving including:
a first series circuit having a first wiring diode and a first switching-off relief capacitor, which said first series circuit shunts said first antiparallel circuit;
a second series circuit having a second wiring diode and a second switching-off relief capacitor, which said second series circuit shunts said fourth antiparallel circuit;
a third series circuit having a first storage capacitor and a first d-c load, which said third series circuit is shunted across said first voltage divider capacitor;
a fourth series circuit having a second storage capacitor and a second d-c load, which said fourth series circuit is shunted across said second voltage divider capacitor;
a third wiring diode coupled between the junction point of the first wiring diode and the first switching-off relief capacitor and the junction point of the first storage capacitor and the first d-c load; and
a fourth wiring diode coupled between the junction point of the second wiring diode and the second switching-off relief capacitor and the junction point of the second storage capacitor and the second d-c load.

2. The three-level inverter according to claim 1, wherein said inverter has multiple phases, with each said phase coupled to the same said third series circuit by one said third wiring diode for each phase, and each said phase coupled to the same said fourth series circuit by one said fourth wiring diode for each phase.

3. The three-level inverter according to claim 1, wherein said first and second d-c loads are ohmic resistors.

4. The three-level inverter according to claim 1, wherein said first and second d-c loads are energy feedback devices, each said feedback device having a switching diode, a storage inductance and a coupling diode, wherein said switching device and said storage inductance are coupled in series to one of said first and second storage capacitors.

5. The three-level inverter according to claim 1, further comprising means for relieving the semiconductor switching elements during a switching-off of the second and third antiparallel circuits, said relieving means including a fifth series circuit having a first supplemental wiring capacitor and a first supplemental wiring diode coupled in parallel, a sixth series circuit having a second supplemental wiring capacitor and a second supplemental wiring diode, and means for discharging said first and second supplemental wiring capacitors.

6. The three-level inverter according to claim 5, wherein said means for discharging the supplemental wiring capacitors are third and fourth d-c loads, said third d-c load being coupled between the junction point of the first supplemental wiring capacitor and the first supplemental wiring diode and the output of the inverter phase, said fourth d-c load being coupled between the junction point of the second supplemental wiring capacitor and the second supplemental wiring diode and the output of the inverter phase.

7. The three-level inverter according to claim 6, wherein the third and fourth d-c loads are ohmic resistors.

8. The three-level inverter according to claim 5, wherein said means for discharging the supplemental wiring capacitors is a third d-c load coupled between the junction point of the first supplemental wiring capacitor and the first supplemental wiring diode and the junction point of the second supplemental wiring capacitor and the second supplemental wiring diode.

9. The three-level inverter according to claim 8, wherein said third d-c load is an ohmic resistor.

10. The three-level inverter according to claim 8, wherein said third d-c load is an energy feedback device having:
- an isolation transformer with a primary winding and a secondary winding;
- a damping resistor which couples said primary winding to the junction point of the first supplemental wiring capacitor and the first supplemental wiring diode, said primary winding also being coupled to the junction point of the second supplemental wiring capacitor and the second supplemental wiring diode;
- a further coupling diode which couples the secondary winding to the positive potential of the d-c voltage source, the secondary winding also being coupled to the negative potential of the d-c voltage source.

11. A three-level inverter, comprising:
- at least one inverter phase having a series arrangement of first, second, third and fourth antiparallel circuits, each antiparallel circuit including a semiconductor switching element and a bypass diode;
- a phase output formed by a junction point of said second and third antiparallel circuits;
- a d-c voltage source which supplies voltage to the phase;
- first and second switching-on relief chokes which couple said series arrangement to the positive and negative potentials of the d-c voltage source;
- first and second voltage divider capacitors coupled to be supplied by the d-c voltage source, with a junction point formed between said first and second voltage divider capacitors;
- a first decoupling diode coupled between said junction point between said first and second voltage divider capacitors and a junction point between said first and second antiparallel circuits;
- a second decoupling diode coupled between said junction point between said first and second voltage divider capacitors and a junction point between said third and fourth antiparallel circuits; and
- means for relieving the semiconductor switching elements during a switching-off process, said means for relieving including:
- a first series circuit having a first wiring diode and a first switching-off relief capacitor, which said first series shunts said first decoupling diode;
- a second series circuit having a second wiring diode and a second switching-off relief capacitor, which said second series shunts said second decoupling diode;
- a third series circuit having a first storage capacitor and a first d-c load, which said third series circuit is shunted across said first voltage divider capacitor and said first switching-on relief choke;
- a fourth series circuit having a second storage capacitor and a second d-c load, which said fourth series circuit is shunted across said second voltage divider capacitor and said second switching-on relief choke;
- a third wiring diode coupled between the junction point of the first wiring diode and the first switching-off relief capacitor and the junction point of the first storage capacitor and the first d-c load; and
- a fourth wiring diode coupled between the junction point of the second wiring diode and the second switching-off relief capacitor and the junction point of the second storage capacitor and the second d-c load.

12. The three-level inverter according to claim 11, wherein said inverter has multiple phases, with each said phase coupled to the same said third series circuit by one said third wiring diode for each phase, and each said phase coupled to the same said fourth series circuit by one said fourth wiring diode for each phase.

13. The three-level inverter according to claim 11, wherein the first and second d-c loads are ohmic resistors.

14. The three-level inverter according to claim 11 wherein said first and second d-c loads are energy feedback devices, each of which has a switching device, a storage inductance and a coupling diode wherein said switching device and said storage inductance are coupled in series with one of said first and second storage capacitors, the junction point between the switching element and the storage inductance being coupled via the coupling diode to one of the positive and the negative potentials of the d-c voltage source.

* * * * *